(12) United States Patent
Shteynberg et al.

(10) Patent No.: US 7,583,035 B2
(45) Date of Patent: Sep. 1, 2009

(54) SYSTEM AND METHOD FOR DRIVING LED

(75) Inventors: Anatoly Shteynberg, San Jose, CA (US); Harry Rodriguez, Gilroy, CA (US)

(73) Assignee: Exclara, Inc., Santa Clara, CA (US)

( * ) Notice: Subject to any disclaimer, the term of this patent is extended or adjusted under 35 U.S.C. 154(b) by 0 days.

(21) Appl. No.: 11/838,186

(22) Filed: Aug. 13, 2007

(65) Prior Publication Data
US 2007/0285031 A1 Dec. 13, 2007

Related U.S. Application Data

(62) Division of application No. 11/142,859, filed on May 31, 2005, now Pat. No. 7,276,861.

(60) Provisional application No. 60/611,539, filed on Sep. 21, 2004.

(51) Int. Cl.
*G05F 1/00* (2006.01)
(52) U.S. Cl. ............... 315/307; 315/291; 315/247; 315/224; 315/312

(58) Field of Classification Search ............... 315/247, 315/246, 224, 225, 209 R, 219, 291–302, 315/307–311
See application file for complete search history.

(56) References Cited

U.S. PATENT DOCUMENTS 6,177,764 B1 * 1/2001 Schwerman ............ 315/39.51

* cited by examiner

*Primary Examiner*—Tuyet Vo
(74) *Attorney, Agent, or Firm*—Nancy R. Gamburd; Gamburd Law Group LLC

(57) ABSTRACT

A system drives one or plurality of LEDs regulating their brightness by controlling LEDs average current or voltage. The system includes a switching power converter and an integrated digital regulator with at least one of electrical, thermal and optical feedbacks. The regulator is constructed as a hysteretic peak current mode controller for continuous mode of operation of the power converter. For discontinuous mode of operation of the power converter a pulse averaging sliding mode control is being used. Average LED current is measured by integrating LED pulse current at off time and hysteretically adjusting on time of the power switch. Input battery is protected from discharging at abnormally low impedance of the output.

22 Claims, 14 Drawing Sheets

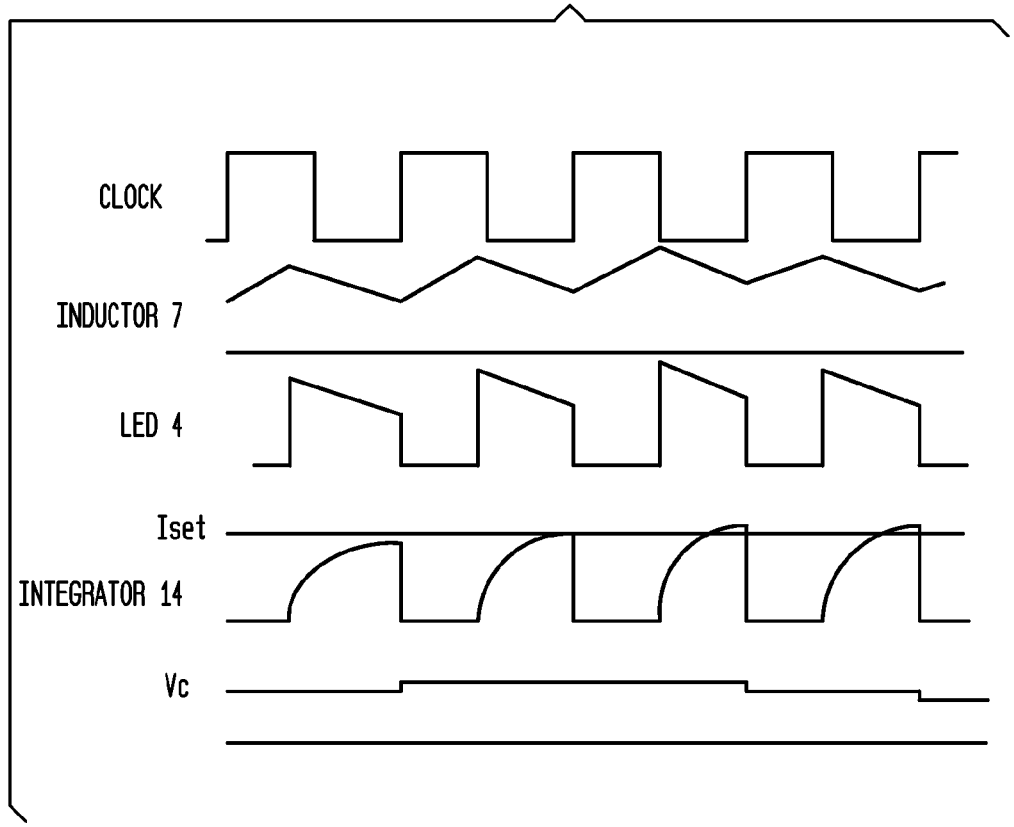

SYSTEM AND METHOD FOR DRIVING LED

RELATED APPLICATIONS

This application is a divisional of and claims priority to Anatoly Shteynberg et al., U.S. patent application Ser. No. 11/142,859, filed May 31, 2005 now U.S. Pat. No. 7,276,861, entitled "System and Method for Driving LED", which is commonly assigned herewith, the contents of which are incorporated herein by reference, and with priority claimed for all commonly disclosed subject matter, and further claims priority to Anatoly Shteynberg et al., U.S. Provisional Application Ser. No. 60/611,539 filed on Sep. 21, 2004, entitled System And Method For Driving LED.

FIELD OF THE INVENTION

The present invention relates generally to power conversion, and more specifically, to a system and method for driving LEDs, and particularly to integrated LED drivers with digital controllers.

BACKGROUND OF THE INVENTION

Known in the industry are a few drivers for light emitting diodes ("LEDs"), like charge pump with the multi-output current mirror from National Semiconductor. These drivers cannot economically boost input voltage more than 1.5 to 2 times and therefore do require parallel circuits for identical drive of multiple LEDs. That makes these drivers large and expensive. Also, required in this case, is a linear current regulator in each channel which compromises the efficiency of an LED driver.

It is also known an inductor based boost converter, like LT 1932 from Linear Technology™ or NTC5006 from On—Semiconductor™. Mostly used topology is a current mode regulator with the ramp compensation of PWM circuit. Current mode regulator requires relatively many functional circuits and still exhibit stability problems when it is used in the continuous current mode with the duty ratio over 50%. As an attempt to solve these problems the designers introduced constant off time boost converter or hysteric pulse train booster. While they addressed problems of the stability, hysteretic pulse train converters exhibit difficulties to meet EMC and high efficiency requirements.

U.S. Pat. Nos. 6,515,434 B1 and 6,747,420 provide some solutions outside original power converter stages, focusing on additional feedbacks and circuits, which eventually make the driver even larger.

It is an object of this invention to overcome the problems listed above by introducing a process and system for controlling a switching power converter, constructed and arranged for supplying power to one or plurality of LEDs to reduce the size and cost of LED driver. It also would be desirable to propose a controller, which is stable regardless of the current through LED. Another object of the invention is to create a high efficiency LED driver with a reliable protection of driver components and input battery from discharging at the damaged output.

SUMMARY OF THE INVENTION

An LED, having a diode-type volt amp characteristic, presents a very difficult load for a voltage type regulators. That is why all up to date LED drivers are constructed as a regulated current source, including the referenced prior art on FIG. 1.

The current regulator according to the prior art includes a feedback, which is created as a voltage signal proportional to the average LED current. In practically all switching LED drivers, current through an LED is a stream of high frequency pulses, and the above-described feedback introduces phase delays, makes poor dynamic response, and prevents a regulator from acting within one switching cycle.

In an embodiment of the invention, a process is presented for controlling a switching power converter constructed and arranged for supplying power to one or plurality of LEDs, including an inductor, a power semiconductor switch, a rectifier and a capacitor, configured in a boost or buck-boost topology and operating in a dual phase cycle, having an on time phase when said switch is closed and an off time-phase when said switch is open, comprising steps-of: storing energy in said inductor during the on time of the switch, discharging it into LEDs during the off time of the switch, measuring ampseconds of said inductor at off time and adjusting peak current through the said switch to keep said ampseconds in the inductor during the off time constant and proportional to the set average current through LEDs. Thus, the invention is using off time ampseconds in the inductor to generate a one cycle feedback signal. The ampseconds are measured by integrating discharging inductor current during the off time, sampling the integrator at the end of the off time, and resetting the integrator during on time.

In another embodiment of the invention, a process is presented for driving LEDs including steps of: generating a variable switching frequency and a constant off time, measuring ampseconds in said inductor at off time, and adjusting said measured ampseconds for the length of switching cycle by dividing the integrated value of the discharging inductor current by the length of switching cycle and using said quotient as an LED current feedback for the switching cycle in progress.

In still another embodiment of the invention, a sliding mode with pulse current averaging control for driving one or plurality of LEDs driver is proposed. The idea of pulsed current averaging is that in many switch-mode power supply topologies, it is possible to measure input or inductor current in order to obtain an accurate estimate of output current. Sometimes this is called an "estimator" or "observer" by control theorists. Thus, in applications such as those that require output current regulation, this becomes a powerful tool to help controller design. Remarkably, digital implementation of the approach should not require additional analog-digital (A/D) or D/A converters because of some of its special features. Thus, it is possible to get advanced digital performance at substantially reduced monetary cost. Traditionally, in peak current mode control regulation, a user specifies a reference current, and then the power switch switches off when the inductor current rises to this reference current (minus an appropriate slope compensation to maintain global stability). However, in pulsed current averaging, we propose to regulate differently: we propose to regulate directly the length of the power switch on time ($T_{on}$) in order to create the desired peak value $I_p$. We then relate this peak value to the load output current's average value. Hence, load current regulation becomes possible. Since LEDs require current regulation instead of voltage regulation, this makes pulsed current a prime candidate for its application. To demonstrate the proposed regulation approach and show its potential, we describe the pulsed current averaging regulation, using a simple hysteretic controller. The sliding mode control will include the steps of: turning on the power switch at the edge of the lock oscillator; starting counting on time Ton; measuring LEDs average current; comparing said measured current to a set LEDs current and generating the sign of Ton change plus if LEDs current is smaller than the set current and minus if LEDs current is larger than the set current; stop counting on time at set on time Ton=Ton+/−Δton and turning off the power switch; adjusting new on time for the next cycle either increasing or decreasing previous cycle Ton time based on the sign of Ton change.

In still another embodiment of the invention is developed a system for driving one or plurality of LEDs and regulating their brightness, comprising an energy source, coupled to a power converter, controlled by a regulator with a feedback from LEDs In still another embodiment of the invention is developed a system for driving one or plurality of LEDs in which energy source can be an AC/DC, DC/DC converter or battery of varieties of chemistry.

In still another embodiment of the invention is developed a system for driving one or plurality of LEDs and regulating their brightness, including a regulator, comprising an integrator with the reset, which output signal at the end of off time is coupled to an LEDs current comparator; said comparator is sampled by a digital logic, which adjusts an Ip set current for a current peak comparator, second of its terminal being coupled to a peak current sensor; said current peak comparator is coupled to a buffer, driving said power switch.

In still another embodiment of the invention is developed a system for driving one or multiple of LEDs and regulating their brightness, which regulator consists of a passive filter, connected to the terminal of said comparator, coupled to a digital logic, connected to a switch buffer. A second current peak comparator limits the maximum on time and maximum peak current through the power switch.

In still another embodiment of the invention is developed a system for driving one or multiple of LEDs and regulating their brightness, which includes a digital PI or PID regulator, based on generation of a digital regulation error by a non DSP method, using two comparators and controlled ramp reference signal. The output of the PI (PID) regulator is connected via an D/A converter to a peak current comparator to regulate the peak current through said power switch.

In still another embodiment of the invention is developed a system for driving one or multiple of LEDs and regulating their brightness, which includes a short circuit protection, consisting of input/output voltage comparator driving a buffer coupled to an isolation switch.

BRIEF DESCRIPTION OF THE DRAWINGS

The teachings of the present invention can be readily understood by considering the following detailed description in conjunction with the accompanying drawings.

FIG. 6 is a diagram, illustrating signal waveforms in a regulator with integrator.

DETAILED DESCRIPTION OF EMBODIMENTS

Figure 1:
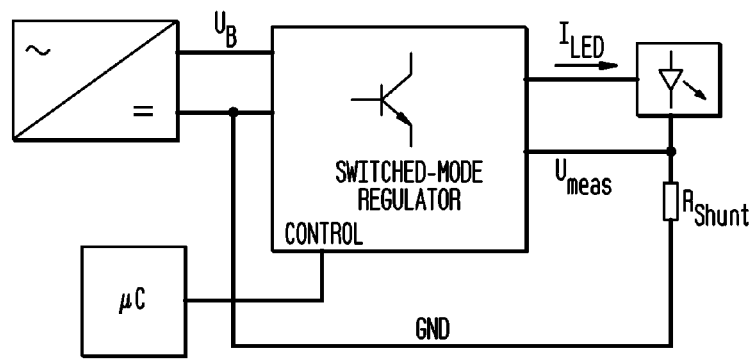
FIG. 1 is a prior art current regulator according to the U.S. Pat. No. 6,747,420 B2.

The embodiments of the present invention will be described below with reference to the accompanying drawings. Like reference numerals are used for like elements in the accompanying drawings.

Figure 2:
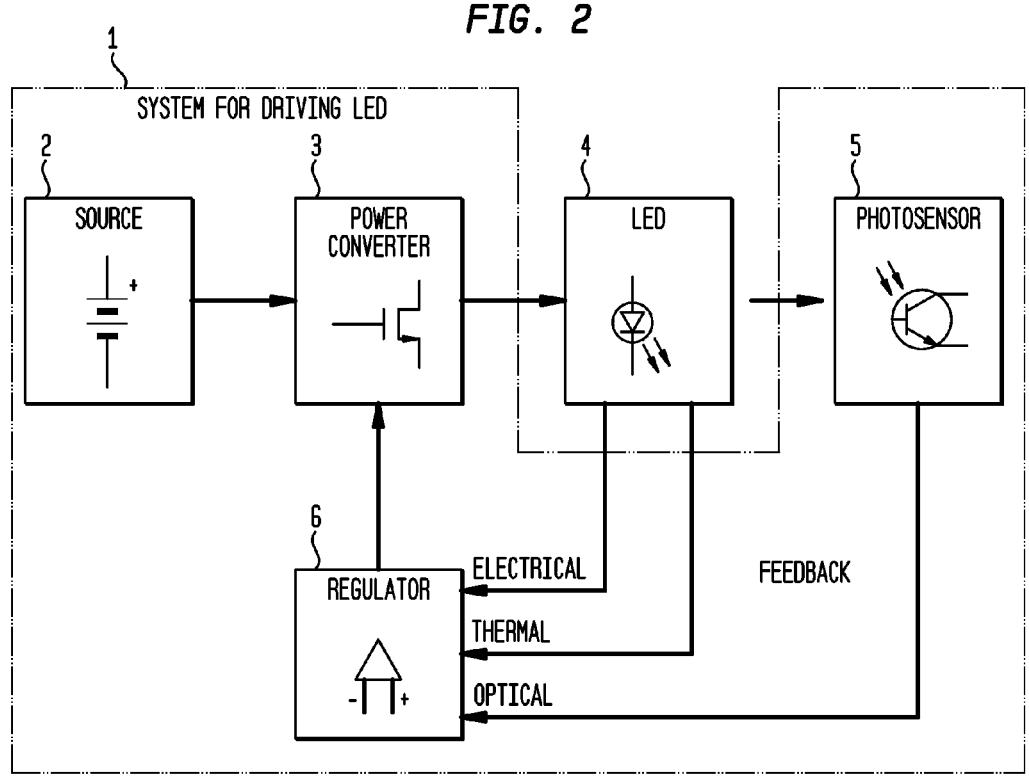
FIG. 2 is a system for driving one or a plurality of LEDs.

FIG. 2 is a system for driving one or plurality of LEDs, according to one embodiment of the invention. The system 1 includes an energy source 2 and a switching power converter 3 driving a string of LEDs 4. The performance of LEDs is measured by electrical and thermal sensors (not shown separately from LED unit 4) and a photosensor 5. These sensors generate electrical, thermal and optical feedback channels coupled with a regulator 6 controlling the output of the power converter 3. The regulator 6, according to one embodiment of the invention, needs to have as a minimum a single electrical feedback. Yet, it may use additional thermal and optical feedback channels for enhanced performance, according to another embodiment of the invention. The energy source 2 is an AC/DC converter, connected to the AC utility line (not shown) in one embodiment of the invention. The energy source 2 is a DC/DC converter connected to any DC voltage source (not shown) according to another embodiment of the invention. Yet in another embodiment of the invention the energy source 2 is a battery, which may be of variety of technologies (like solar panels or electrical rechargeable or non-rechargeable batteries of varieties of chemistries). The regulator 6 is constructed as analog, mixed signal or digital functional block according to embodiments of the invention. A fixed high frequency oscillator 30 is supplying clock signal to the regulator 6.

Figure 3:
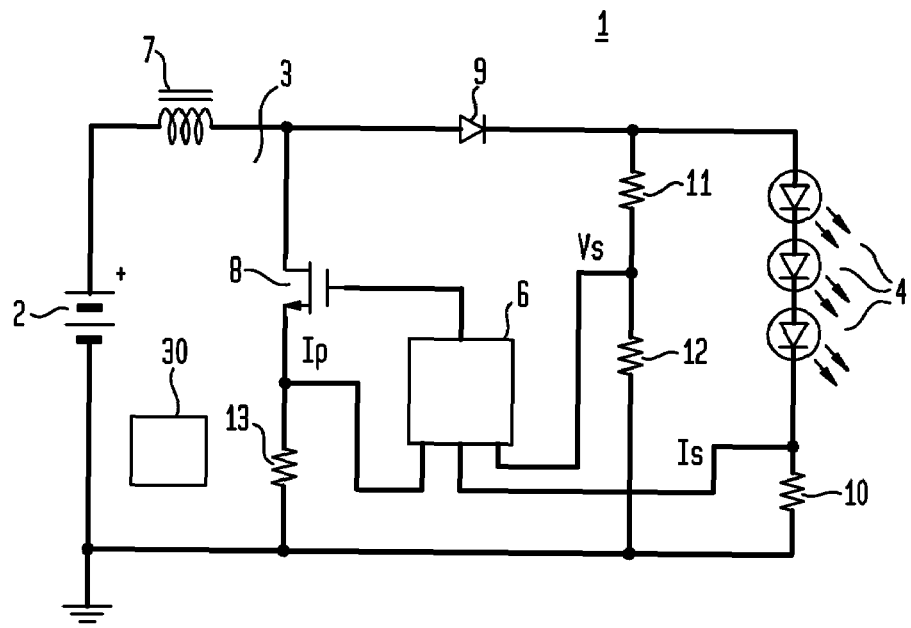
FIG. 3 is a step up converter for driving one or a plurality of LEDs.
Figure 4:
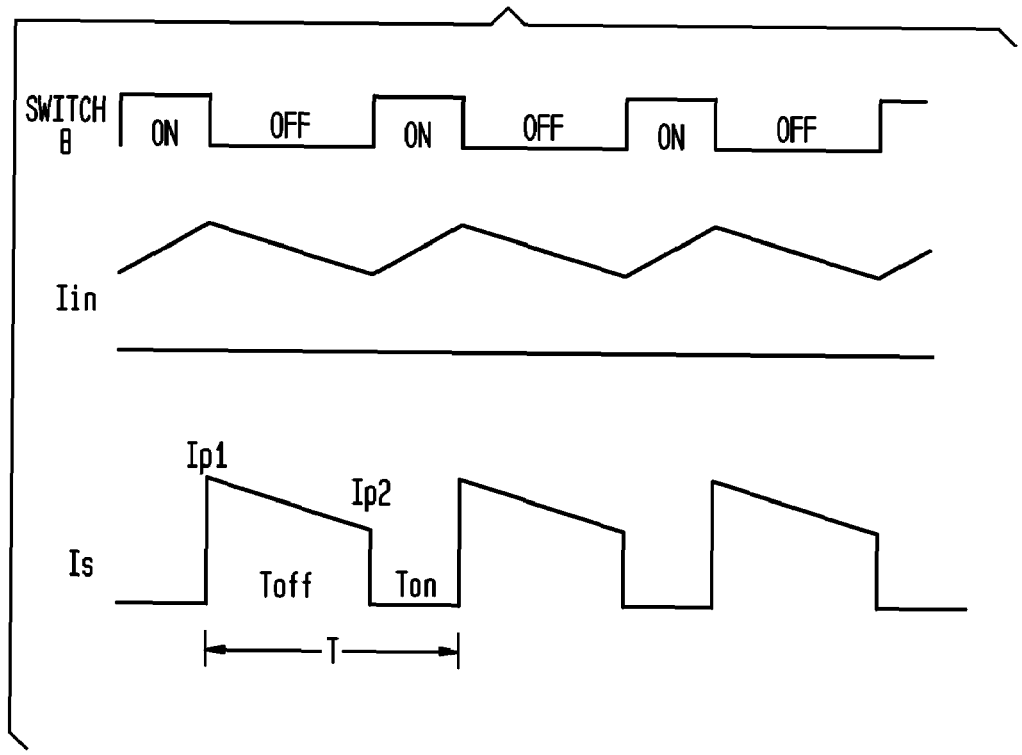
FIG. 4 is a diagram, illustrating current waveforms of a switching converter according to one embodiment of the present invention.

The power converter on FIG. 2 is a step up (if the source voltage should be boosted) or a step down (if the source voltage should be decreased) switching converter, preferably inductor-based boost, or buck boost topology according to the embodiments of the invention. FIG. 3 is a system with a boost power converter 3 comprising a battery 2, inductor 7, a semiconductor power switch 8, a rectifier 9, regulator 6, an Ip peak current sensor 13, an LEDs current sensor 10, a voltage sensor 11 and 12, a string of LEDs 4 and an oscillator 30, according to one embodiment of the invention. The performance of the boost converter is illustrated by FIG. 4. The power switch 8 is turned on and off by the regulator 6, storing energy in the inductor 7 at on time and discharging it into LED at off time. Current in the inductor 7 Iin is shown on FIG. 4 as continuous. However it may also be discontinuous, depending on the mode of operations (not shown). The current through LEDs is marked as Is and represents a stream of high frequency pulses, shaped during off time of the converter 3. When the power switch 8 is closed, energy is stored in the inductor 7. The inductor current increases to a value of $I_{P1}$, that is determined by the on time of the power switch, the inductor value and battery voltage. When the power switch 8 is open, the energy in the inductor 7 is delivered to the load. The inductor current during this time decreases to a value of $I_{P2}$, which is dependent on the off time of the power switch. Assuming ideal components, the relationship between input voltage and other parameters can be defined by the following equation:

$$V_{IN}=L(I_{P1}-I_{P2})/T_{ON}, \quad (1)$$

Where
  $V_{IN}$=DC input voltage,
  $I_{P1}$=peak current in the inductor at the end of charging,
  $I_{P2}$=peak current in the inductor at the beginning of the inductor Charging,
  $T_{ON}$=on time,
  L=inductance.

When the power switch 8 is open, the inductor 7 discharges energy into the output load. The output voltage is defined by the following equation:

$$-V_{IN}+V_{OUT}=L(I_{P1}-I_{P2})/T_{OFF}, \quad (2)$$

Where
  $V_{OUT}$=DC output voltage
  $T_{OFF}$=off time

Assuming average LEDs current:

$$I_{AVG}=V_{OUT}/R_D \quad (3)$$

$R_D$=equivalent DC resistance of the LEDs is assumed to be known.

$$I_{AVG}=(I_{P1}+I_{P2})T_{OFF}/2(T_{ON}+T_{OFF}) \quad (4)$$

and assuming a steady process, $$V_{IN}*T_{ON}=(-V_{IN}+I_{AVG}*R_D)*T_{OFF} \quad (5)$$

The on time can be determined by the following equation:

$$T_{ON}=(-V_{IN}+I_{AVG}*R_D)*T_{OFF}/V_{IN} \quad (6)$$

The frequency of the output is equivalent to:

$$f=1/(T_{ON}+T_{OFF}) \quad (7)$$

Solving equations (1) through (6), $$I_{P1}=(V_{OUT}-V_{IN})T_{OFF}/2L+I_{AVG}(V_{OUT}/V_{IN}) \quad (8)$$

$$I_{P2}=(V_{OUT}-V_{IN})T_{OFF}/2L-I_{AVG}(V_{OUT}/V_{IN}) \quad (9)$$

Figure 5:
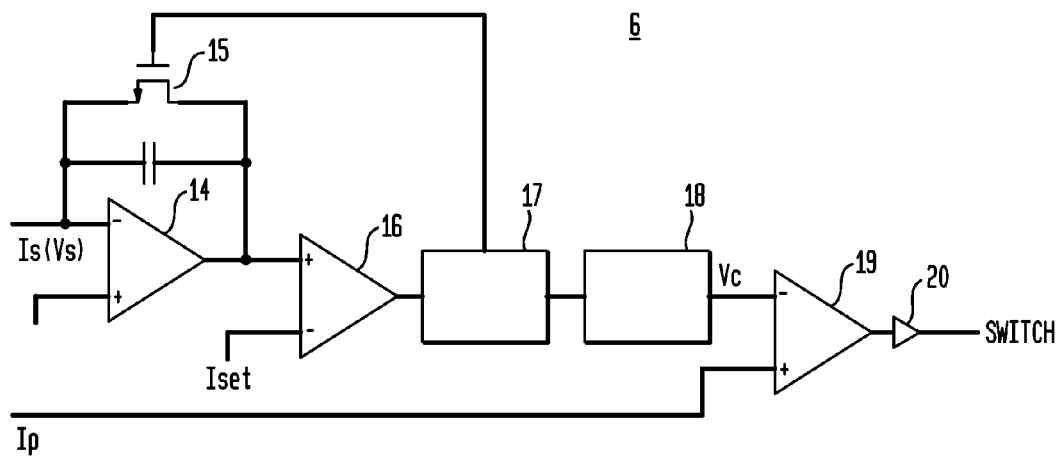
FIG. 5 is a block diagram of a regulator with an integrator according to an embodiment of the invention at constant switching frequency.

FIG. 5 is a regulator 6, according to one embodiment of the invention, and comprising input to LEDs current feedback Is (or voltage Vs), an integrator 14 with a reset switch 15, an LEDs current comparator 16, digital logic 17, an A/D converter 18, an Ip peak current comparator 19, and a buffer 20 driving the power switch 8. The following theoretical analysis represents a synthesis of the process of driving of a nonlinear load (like a single or multiple strings of LEDs) from a current source, regulating averaged current or voltage at the load. On FIG. 6 is shown the LEDs 4 current 4 and the inductor 7 current. The integrator 14 integrates LED 4 current signal, shown as a waveform for integrator 14 on the FIG. 6. The integral of the LEDs 4 current during the off time:

$$\int_0^{T_{off}} I_s dt = \int_0^{T_{off}} \left(Ip1 - (Ip1 - Ip2)\frac{t}{T_{off}}\right) dt \quad (10)$$

$$= (Ip1 + Ip2)\frac{T_{off}}{2}$$

According to the waveform for LEDs 4 on the FIG. 6 the average LEDs current is equal to $$Iavg = (Ip1 + Ip2)\frac{T_{off}}{2T} \quad (11)$$

T-cycle Time

Comparing Iavg in (11) and integral (10) we can make a conclusion that the integral (10) would be a) proportional to the average LEDs current if cycle time T is constant and b) equal to the average LEDs current if the integrated value is divided by cycle time T. In one embodiment of the invention the process of driving LEDs with the constant switching frequency is based on steps of storing energy in the inductor during on time of the power switch, discharging it into LEDs during off-time of the power switch, measuring ampseconds of said inductive element at off time and adjusting peak current through the said switch to keep said off time ampseconds in the inductor during off time constant and proportional to the set average current through LEDs. Thus, the invention is using generation of the off time ampseconds signal in the inductor as one switching cycle feedback. The ampseconds are measured by integrating discharging inductor 7 current during off time, sampling the integrator 14 at the end of off time, and resetting the integrator 14 during on time.

Expression (10) is a theoretical interpretation of the method: to keep LED brightness constant at constant frequency, the input voltage changes are compensated in such a manner that the inductor off time ampseconds and average current of the LED remains constant (or regulated). The method is illustrated on FIG. 5 and FIG. 6. The integrator 14 starts integrating the LED current at the beginning of off time. At the end of the cycle the digital logic 17 samples the output of the integrator 14. At the same time the power switch 8 is turned on. Sampled voltage (V14) from integrator 14 is compared with the Iset signal. If V14<Iset then logic adds a ΔVC signal to the switch comparator 19 reference voltage Vc=Vc+ΔVC. When Ip reaches its set value by Vc the comparator 19 turns off the power switch 8. If V14>Iset then Vc=Vc−ΔVC and new peak current will be reduced. During on time the output of the integrator 14 is shorted by the reset switch 15. In one embodiment of the invention, updating of the control voltage Vc is linear:

| Iset = V14 | Vc(n + 1) = Vcn |
| Iset > V14 | Vc(n + 1) = Vcn − ΔVc |
| Iset < V14 | Vc(n + 1) = VcnT + ΔVc |

Thus regulator 6 on FIG. 5 provides hysteretic current mode control of LED current with a dynamic response within one switching cycle. In normal conditions the output current will be hysteretically adjusted at the set level. That makes the controller inherently stable and does not require compensation. At transient (change of Vin, temperature or LED performance, including shorted or open device) the controller will adjust primary peak current to have LED current equal to Iset.

Figure 7:
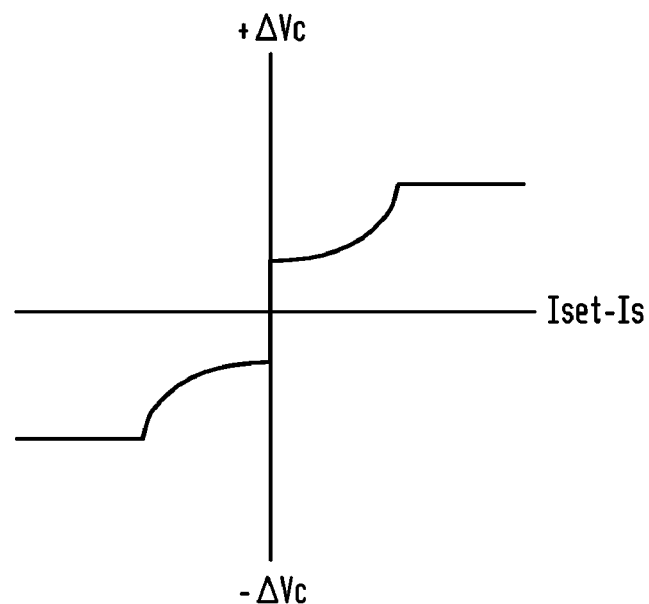
FIG. 7 is a diagram of a nonlinear control voltage dependent on the current error Iset-Is.

Yet in another embodiment of the invention the control voltage ΔVc is adjusted based on function presented on FIG. 7, inversely proportional to a difference between set and measured signals.

Figure 5A:
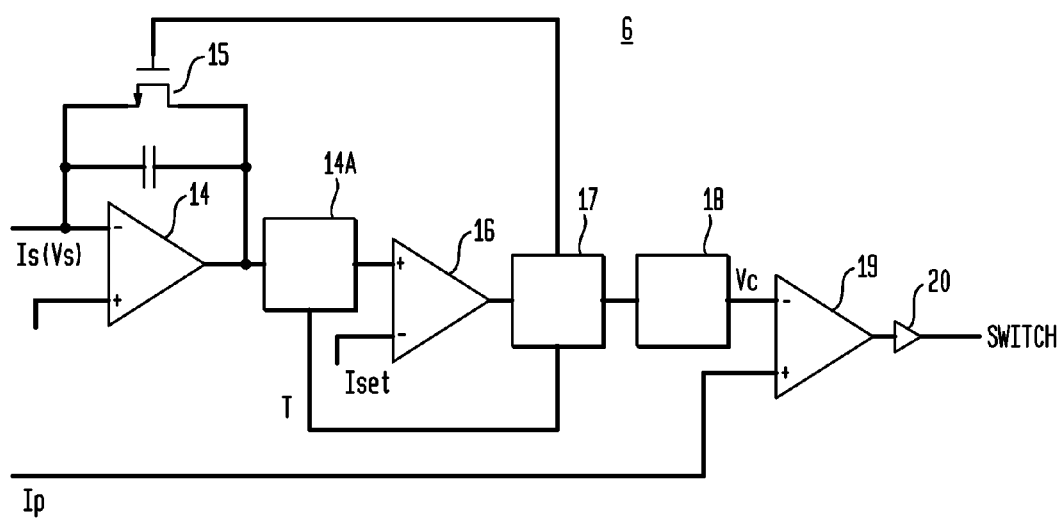
FIG. 5A is a block diagram of a regulator with an integrator according to an embodiment of the invention at variable switching frequency.

Yet in another embodiment of the invention the off time is kept constant by digital logic 17 and cycle time is variable, defining by the controller (regulator) 6. In this embodiment a divider by cycle time 14A is added to the output of integrator 14, and output of the divider 14A is connected to the positive terminal of LED comparator 16 (it is shown on FIG. 5A)

Figure 8:
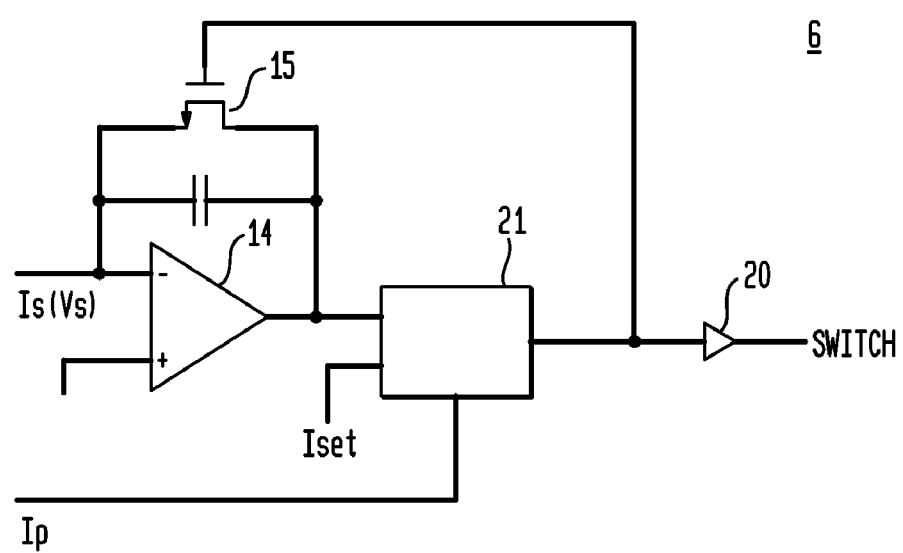
FIG. 8 is a block diagram of a regulator with an integrator according to another embodiment of the invention.

Those skilled in art may use different combinations of the circuits to drive one or multiple of LEDs according to said method. A digital implementation of the same regulator 6 is shown on FIG. 8, where 21 is a digital logic, combining various functional blocks of FIG. 5, subject of those skilled in the art.

Traditionally, in peak current mode control regulation, a user specifies a reference current, and then the power switch switches off when the inductor current rises to this reference current (minus an appropriate slope compensation to maintain global stability). However, in pulsed current averaging, we propose to regulate differently: we propose to directly regulate the length of power switch on time ($T_{on}$) in order to create the desired peak value $I_p$. We then relate this peak value to the load output current's average value. Hence, load current regulation becomes possible. Since LEDs require current regulation instead of voltage regulation, this makes pulsed current averaging a prime candidate for its application. Our goal is now to relate the control variable $T_{on}$ to the output current through the load. Peak current in the inductor, assuming discontinuous operation:

$$Ip = \frac{VinTon}{L} \quad (12)$$

Ip—Peak current in the inductor 7
Vin—Input voltage

Average current in the load:

$$Iav = \frac{IpToff}{2T} \quad (13)$$

Volt second balance of the inductor $$Vin*Ton=(Vout-Vin)Toff, \quad (14)$$

where
Vout-Output average voltage

Combining equations (12) to (14) and solving it to Ton we'll get dependence of average current from the variable Ton:

$$Iav = Ton\frac{V_{in}^2}{2LVout} \quad (15)$$

The conclusion of this simplified analysis is that the on time of the power switch is proportional the output current. Thus, by adjusting $T_{on}$, the output current through the load will be changed in a linear relation. Notice, also, that the output current is inversely proportional to the output voltage in this relation. Therefore, in systems in which output voltage may quickly deviate from a desired value, this method may need to utilize advanced nonlinear controllers for regulation. This has compelled researchers to utilize multiplications in controllers to adjust $T_{on}$. That is, an inner current loop in power factor correction circuits often makes $T_{on} \propto kV_{OUT}(I_{Ref}-I_L)$. This is obviously a more complicated and nonlinear controller because it requires digital multiplication, as well as an additional outer voltage loop (usually PI controller) to help regulate the voltage.

Instead of a complicated approach to control, we propose to use the relation of $T_{on}$ to $I_{av}$ in a hysteretic/sliding mode scheme that simplifies implementations and would not require external A/D converters. The idea is to increase or decrease $T_{on}$ by discrete pulses in order to control the average current being delivered to a load: hence, the terminology pulse average current control. Conventional methods for controlling the current output of commercially available integrated circuits for LEDs drivers uses a combination of analog operational amplifiers and compensation ramp generators. We have come up with a digital control approach to controlling output currents that does not require these additional parts. This is not a DSP engine with software overhead; this is an optimized digital core that uses a sliding control algorithm to determine the amount of power to transfer to the output using a boundary/sliding mode control criteria.

Figure 9:
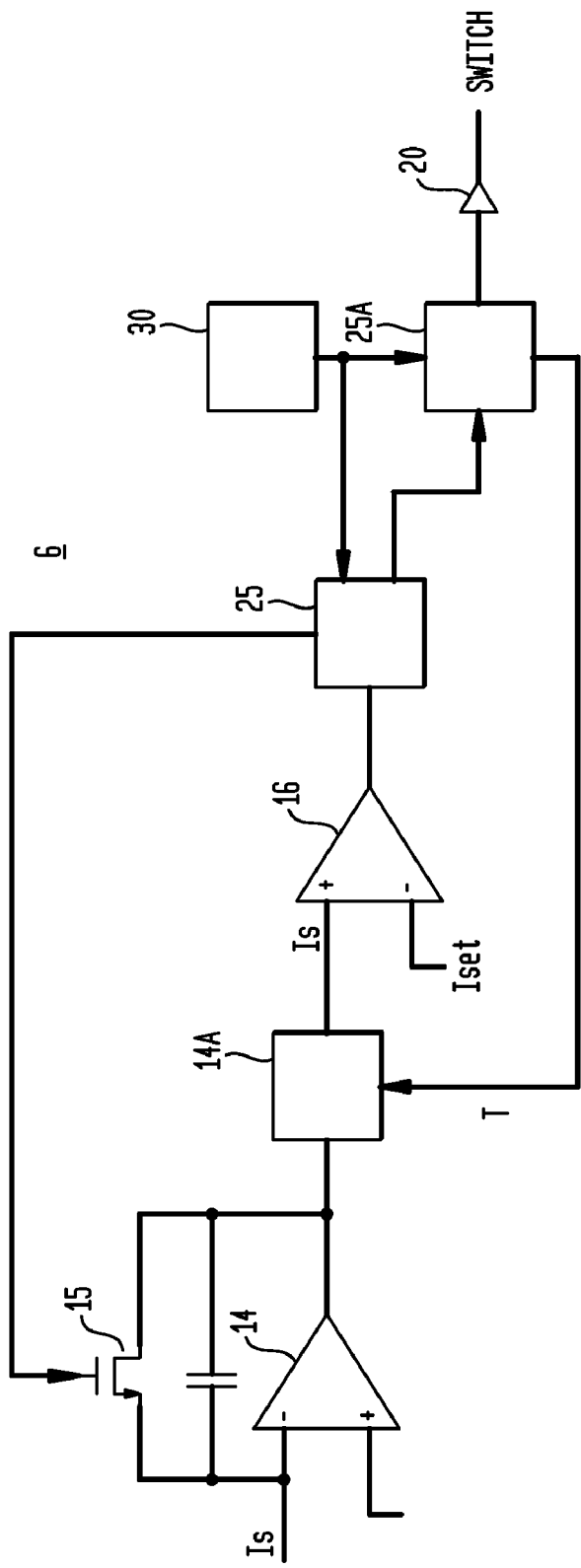
FIG. 9 is a block diagram of a regulator according to the sliding mode control of the invention.

To demonstrate the proposed regulation approach according to one embodiment of the invention and show its potential, we describe the pulsed average current regulation using a simple hysteretic controller. The pulse average current regulation comprises the following steps, see FIG. 3 and FIG. 9: oscillator turns on switch 8, and current starts building in the inductor 7; at the same time Time register $T_{on}+/-\Delta t_{on}$ is set with the count of time Ton, when $t=T_{on}$ switch 8 is turned off;

Inductor 7 starts to discharge (it is assumed that the conversion process is always discontinuous;

LED current is sensed and integrated by integrator 14 for a period of off time Toff;

the integrated value is sampled by digital logic 25 at the end of cycle time and integrator 14 is reset by switch 15;

sampled integrated value is divided in divider 14A by cycle time T and it is compared with the set value of the LED current Iset

| | | |
|---|---|---|
| If | Is < Iset | The controller selects to change $T_{on}$ by $+\Delta ton$ |
| If | Is > Iset | The controller selects to change $T_{on}$ by $-\Delta ton$ | on time in the Time register 25A is adjusted by $+\Delta t_{on}$ or $-\Delta t_{on}$;

new cycle starts.

If system detects more than two consecutive cycles with the same sign of Δton increment, system may use look up tables to adjust these increments to accelerate convergence of measured Is signal and reference Iset.

Figure 9A:
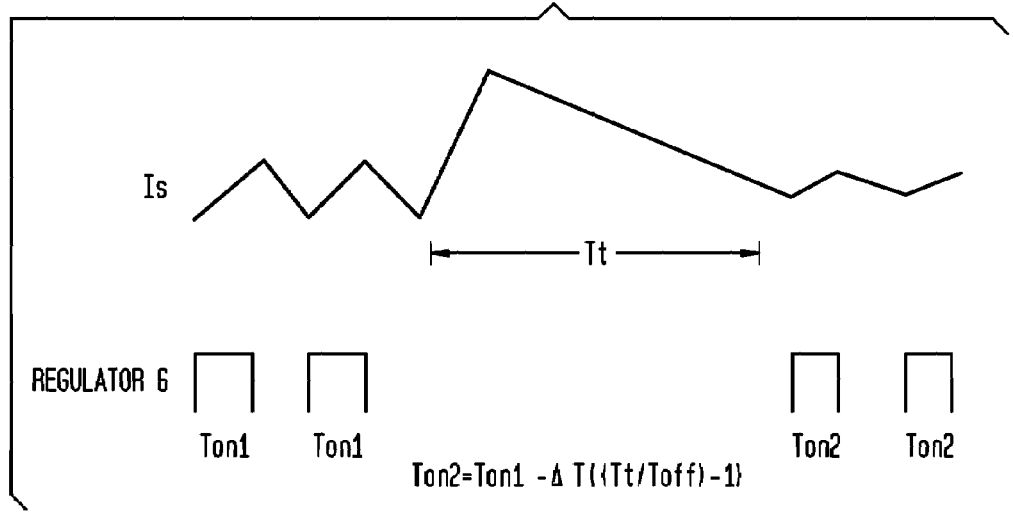
FIG. 9A is a diagram illustrating an algorithm of the sliding mode control of the invention.
Figure 9B:
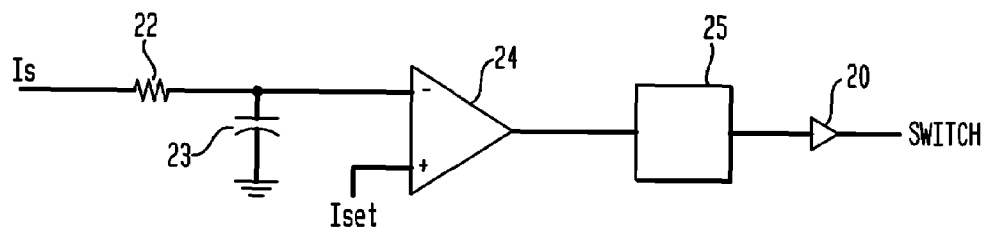
FIG. 9B is a block diagram of a regulator according to a sliding mode control with a passive LED current filter.

A simplified sliding mode regulator is presented on FIG. 9B. Instead of an active integrator 14 with reset, a passive R-C filter (resistor) 22 and (capacitor) 23 is used. That simplifies the implementation at the expense of reduced speed of dynamic response of the regulator. The digital logic 25 combines all necessary functions described above.

In another embodiment of the invention (FIG. 9, FIG. 9A) the LEDs comparator 16, as soon as it detects the transition of the Is current over reference Iset, sends the signal (high) to the digital logic 25;

the digital logic 25 starts Iset timer (not shown separately from digital logic 25) and keeps power switch 8 off;

power switch 8 is off and Iset timer is counting time Tt until LED current comparator 16 detects Is transition below I set level by sending a signal (low) to the digital logic 25;

the digital logic stops Iset timer, reads its content and divides it by off time to define new Ton time as $Ton_{i+1}=Ton_i-\Delta ton((Tt/Toff)-1)$ We call the described process as asymmetrical hysteretic algorithm of adjusting on time Ton, the purpose of which is to improve the dynamic response of the regulator and limit the ripple of LED current. A symmetrical hysteretic algorithms includes two LED comparators 16 (not shown) each set slightly apart to form a window for current ripple and otherwise working independently and similar to the above described process.

Figure 10:
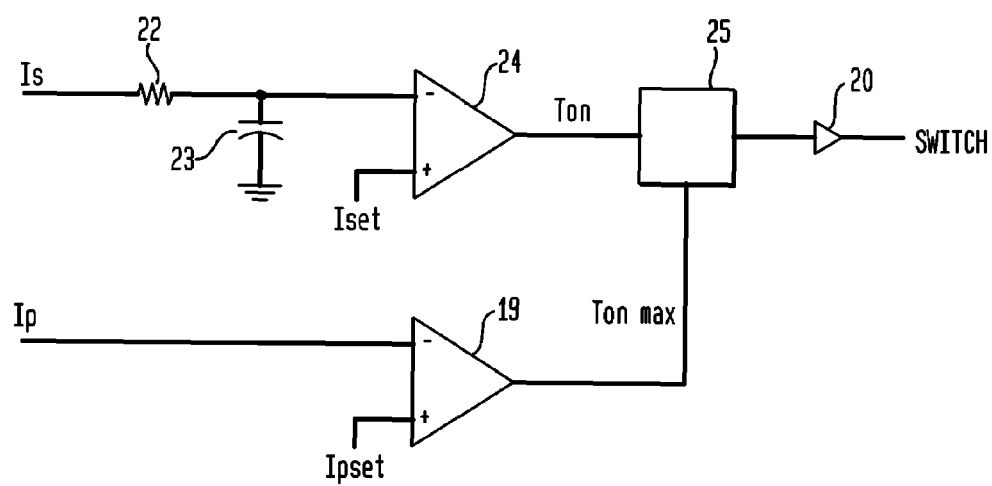
FIG. 10 is a block diagram of a sliding mode control regulator according to another embodiment of the invention.

FIG. 10 is a sliding mode regulator 6 with the limited maximum on time Ton max or maximum peak current in the inductor. This limit is achieved by adding an Ip peak current comparator 19 to the regulator, described in FIG. 9B. Ip comparator is connected with its negative terminal to Ip current sense and it positive terminal to the Ipset reference. The output of comparator 19 is sampled by the digital logic 25 each switching cycle.

Figure 11:
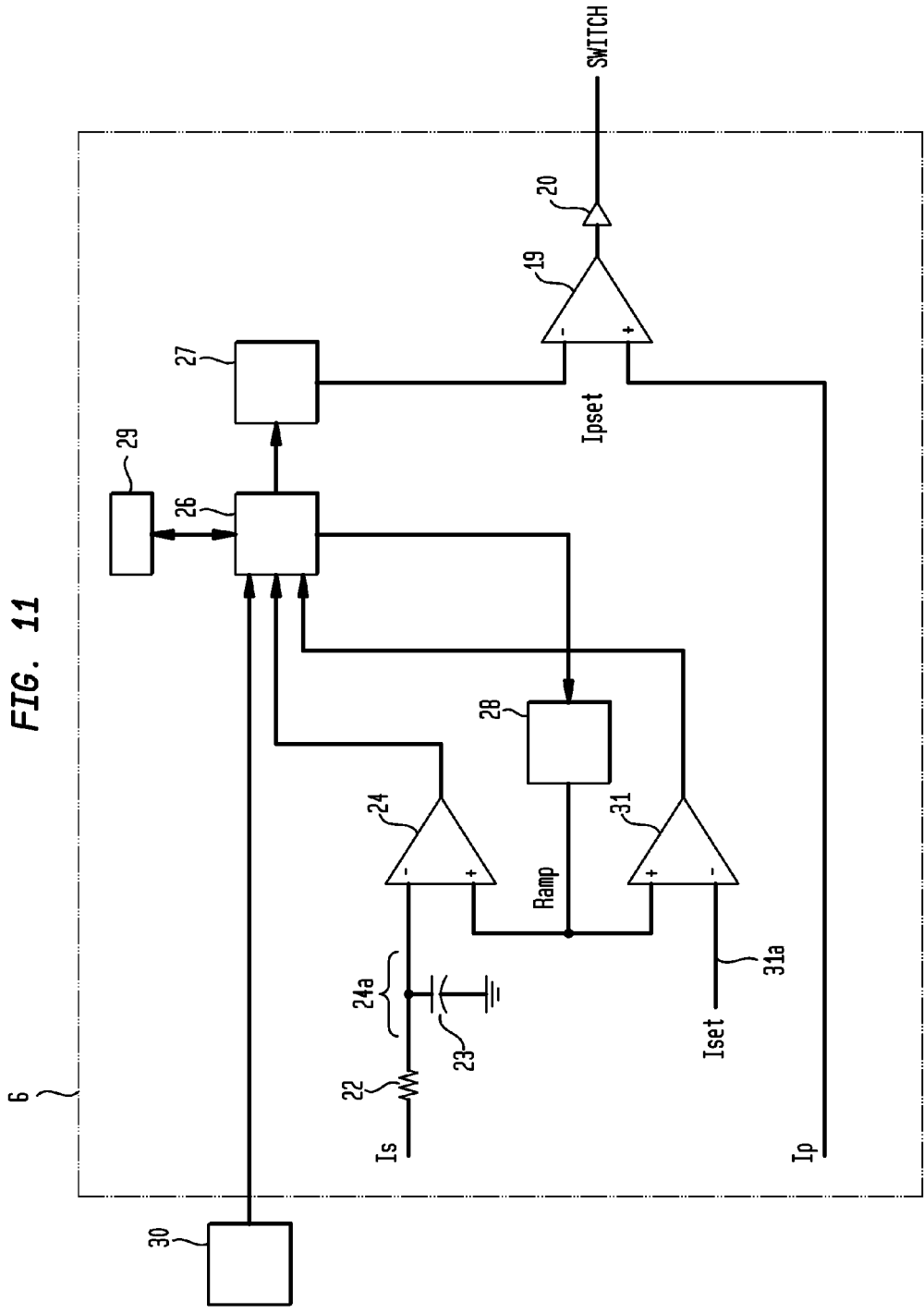
FIG. 11 is a block diagram of a PI regulator with Ipset output according to the invention.

The presented above sliding mode regulator 6 will be stable preferably in the discontinuous mode of operation. Another embodiment of the invention on FIG. 11 is a digital PI or PID regulator capable to drive one or plurality of LEDS with the continuous current in the switching converter FIG. 3. In the embodiment of FIG. 11 average LED current Is is filtered by a passive R-C network 22-23. An LED current comparator 24 is connected with its negative terminal to 24a (-Is current filter 22, 23), and with its positive terminal to output of a ramp generator 28. A current set comparator 31 is connected to said ramp generator 28 by its positive terminal. The negative terminal of the comparator 31 is connected to a set current reference signal Iset 31a. Outputs of both comparators 24 and 31 are connected to the digital logic 26. The digital logic 26 controls a ramp generator 28, which generates a periodical ramp signal (28b) with the minimum ramp signal selected to meet requirements of a maximum negative error and maximum ramp signal to meet the requirements of a maximum positive error. For example, assuming that at the nominal LEDs current Is signal (on 24a) is 200 mV and maximum negative and positive errors are 25%, then the ramp signal 28b must be at least 150 mV to 250 mV. The time base of this ramp signal is defined by a desired resolution. Selecting, for example, a+/−6 bit resolution will give us at clock frequency 100 MHZ of the oscillator 30 the base time 10×2×64=1280 nS or frequency of 781 kHZ, which is about the frequency of typical LED drivers, meaning that the error generation may have at most one cycle delay. The accuracy of the error generation per given example will be 50×100/200×64=0.39%. Those skilled in the art may design the ramp generator per their specific requirements, using fundamental guidelines of this specification.

Figure 12:
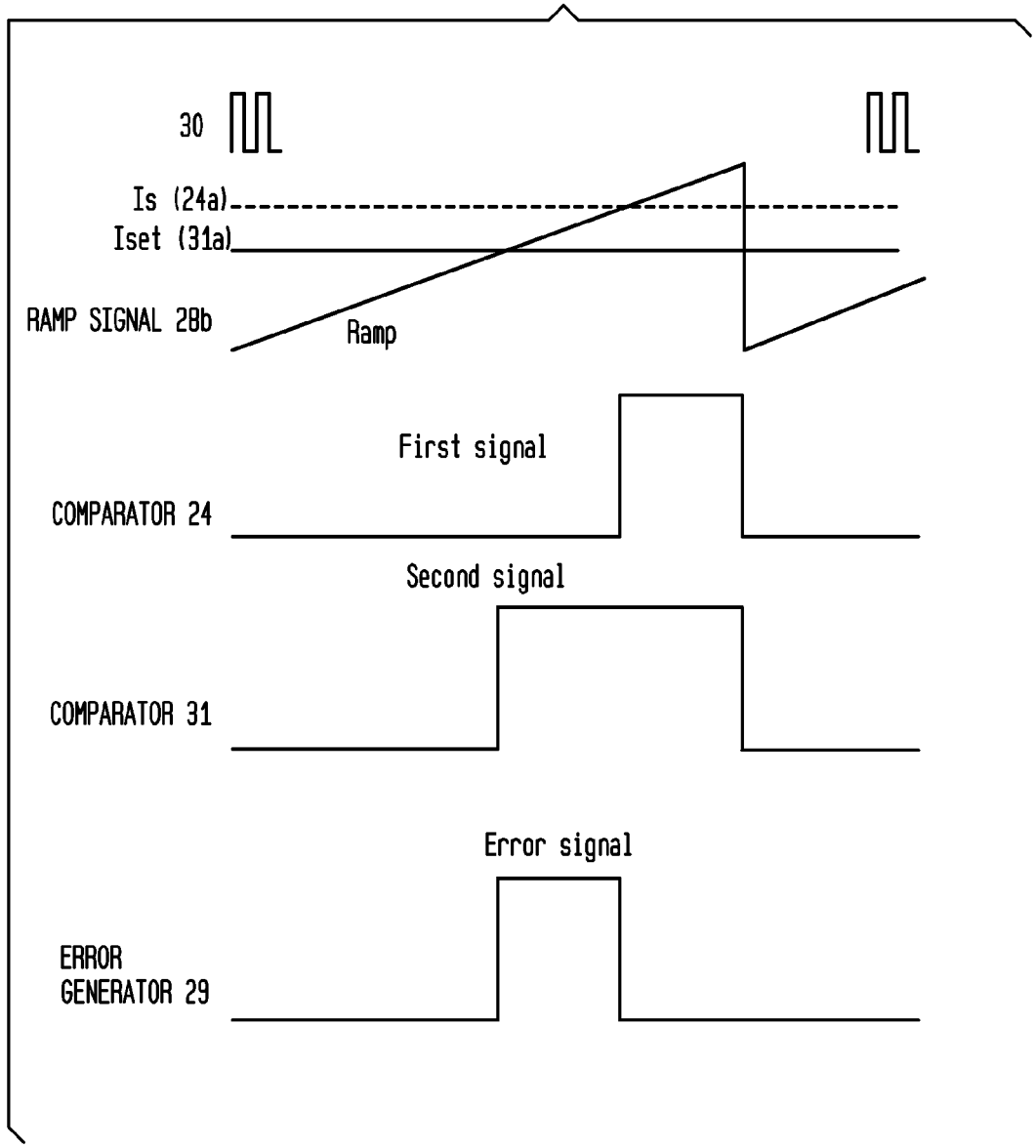
FIG. 12 is a diagram illustrating signal waveforms of an error generator.

As ramp generator 28 starts the ramp, both comparators 24 and 31 are in the same state, low or high. Example of FIG. 12 assumes low. At some moment of the ramp both comparators 24 and 31 will change the state going high. We call signal generated by the comparator 24 first and by the comparator 31 second. Digital logic 26 samples the comparators 24 and 31 at every clock of oscillator 30 and reads both first and second signals. Whichever signal comes first starts a time counter of an error generator 29. Whichever signal comes last stops the time counter. The digital logic 26 assigns a sign to generated error positive if said first signal comes last and negative if said second signal comes last. The digital logic 26 controls the frequency of the ramp generator 28 and generates an error signal once per cycle of ramp generator frequency. The implementation of digital error estimation was illustrated using relatively simple functional blocks without A/D converters. This implementation does not need to have necessarily the functional blocks described above. Those skilled in the digital art may use different architectures to make a non DSP digital error estimation by using the following steps according to the provided embodiment of the invention:

a) measuring off time ampseconds of said inductor or directly average LEDs current;

b) generating a periodical ramp signal at a constant frequency preferably smaller than switching frequency of said power converter, wherein said ramp signal is equal preferably at the middle of the ramp to LEDs current set reference signal;

c) comparing once per a cycle of said ramp frequency said ampseconds signal with said ramp signal and generating a first signal at the instance when said ramp signal starts exceeding said ampseconds signal;

d) comparing once per a cycle of said ramp frequency said set reference signal with said ramp signal and generating a second signal at the instance when said ramp signal starts exceeding said set reference signal;

e) starting an error time counter by said first signal or by said second signal whichever comes first;

f) stopping said error time counter by said first signal or by said second signal whichever comes last;

g) reading said error time counter as a digital error and assigning a sign to said error positive if said first signal comes last and negative if said second signal comes last.

h) resetting all registers and start new cycle of error estimation.

Figure 11A:
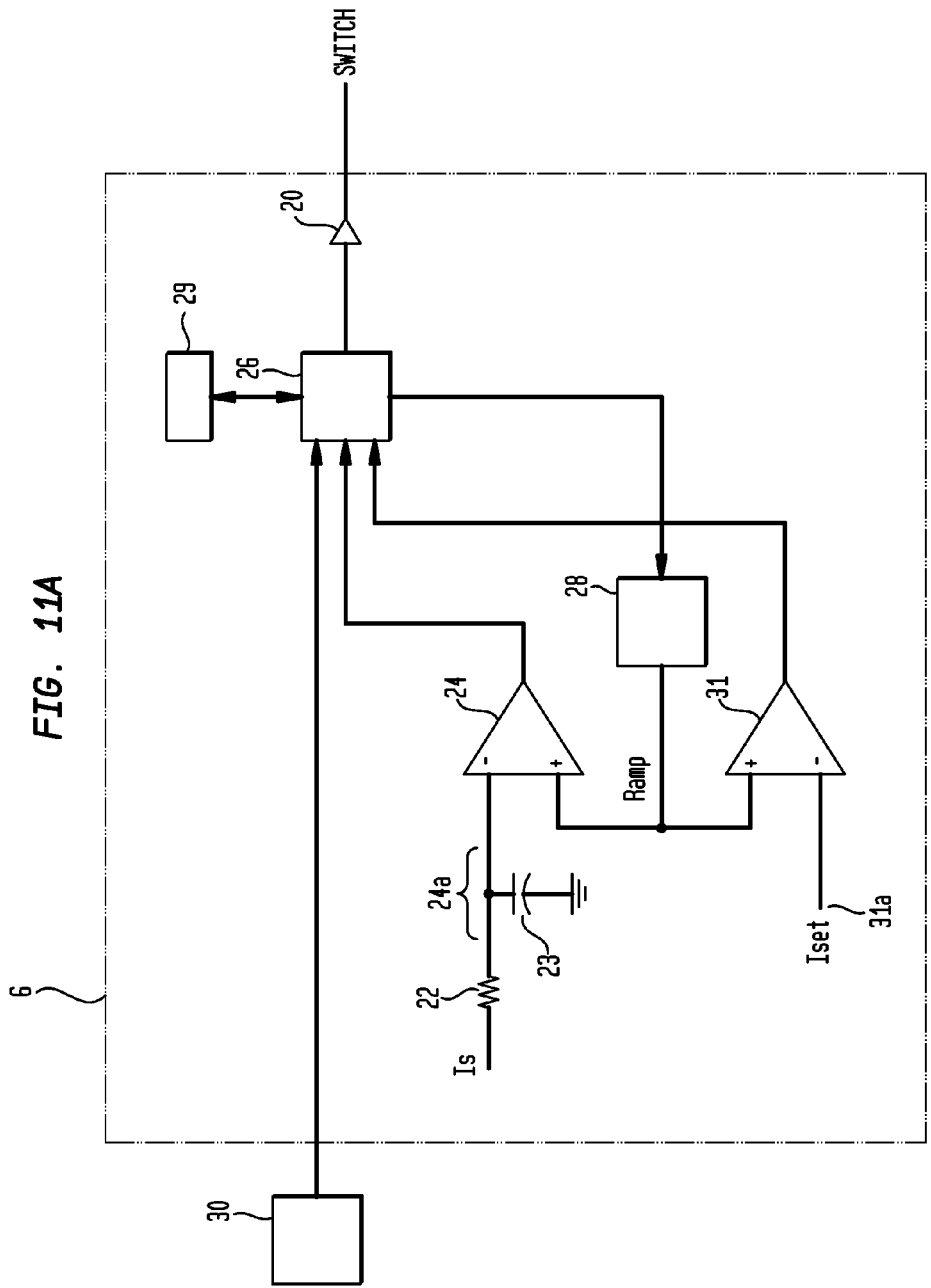
FIG. 11A is a block diagram of a PI regulator with Ton output according to the invention.

Digital logic 26 is using the generated error to process it in a digital PI or PID regulator (not shown separately) with desired for stability gains of proportional and integrated/differential parts. The output of the PI/PID regulator may generate in digital form either on time Ton for keeping the switch 8 closed (FIG. 11A), or an Ipset level, which is shown on FIG. 11. A D/A converter 27 translates digital form of Ipset into analog which is used by comparator 19 and buffer 20 to drive the switch 8 by regulating its peak current. A PI/PID regulator inside digital logic must be designed with necessary compensation to comply with continuous current performance at any duty cycle with practical limits from 0 to 1.

For those skilled in the art the design of such compensation is a routine task. The PID controller has the transfer function:

$$Gc(s) = K_1 + \frac{K_2}{s} + K_3 s$$

where: s=complex variable of Laplace transform,
Gc(s)=compensator,
$K_1$=proportional gain coefficient,
$K_2$=differential coefficient,
$K_3$=Integral coefficient.

The PID controller has a robust performance and a simplicity that allows for digital implementation to be very straight forward.

The Z domain transfer function of a PID controller is:

$$Gc(z) = K_1 + \frac{K_2 Tz}{(z-1)} + K_3 \frac{(z-1)}{Tz}$$

where: z=complex variable of Z transform,
Gc(z)=compensator,
$K_1$=proportional gain coefficient,
$K_2$=differential coefficient,
$K_3$=integral coefficient.

The differential equation algorithm that provides a PID controller is obtained by adding three terms $$u(k)=[K_1+K_2T+(K_3/T)]x(k)+K_3Tx(k-1)+K_2u(k-1)$$

where:
u(k)=the control variable, this signal is used to add or subtract to control pulse.
x(k)=current error sample,
x(k−1)=previous error sample,
T=sampling period,
$K_1$=proportional Gain coefficient.
$K_2$=differential coefficient,
$K_3$=integral coefficient.

This is a useful control function to create a PI or PID controller simply by setting the appropriate gain to zero.

The ramp function will determine a digital value that will serve as the x(k) value in a given control loop. By adjusting gain and delay, precise digital control can be obtained over a variety of systems.

Figure 13:
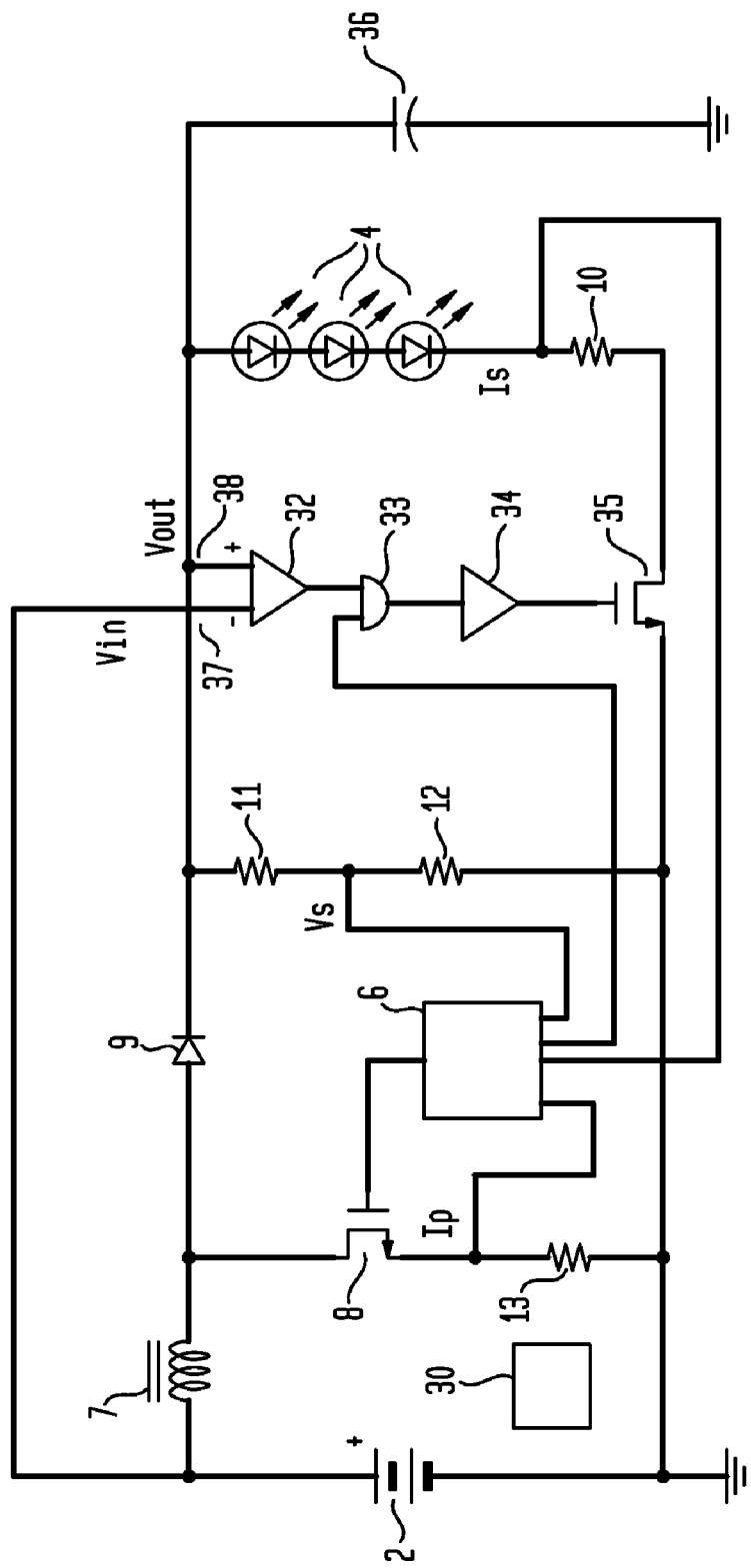
FIG. 13 is a block diagram of a power converter with protection against a short circuit.

System for driving LED on FIG. 13 includes a protection circuit against short circuit of a single or multiple LEDs, according to another embodiment of the invention. The protection circuit consists of a comparator 32, connected to the input 37 and output 38 voltages of the system 1, an AND gate 33, having signals from the regulator 6 and comparator 32, a buffer 34 and a switch 35. At the start of the system input voltage 37 is higher than output 38, and comparator 32 is low, keeping switch 35 open. When the output capacitor 36 is charged above input voltage, the comparator 32 changes its output to high. Assuming that enable signal from the regulator 6 is also high, the buffer 34 will keep the switch 35 closed until a short circuit on the output discharges the output voltage below the input voltage 37. The comparator 32 output goes low, opens the switch 35 and disconnects battery 2 from discharging into low impedance circuit.

The protection circuit 32-38 provides adequate current protection to the input battery of the system, however it may overstress the isolation switch 35 at the time capacitor 36 is discharging into low impedance. Circuit on FIG. 14 has and additional comparator 39 to detect the overload or short circuit. At short circuit or overload the comparator 39 instantly goes high (a small filter against noise is not shown). The output 39 signal goes to the regulator 6 which in turn shuts down the converter 3 and switches its enable signal at AND gate from high to low, opening the switch 35. The regulator 6 may be designed with a few options:

to latch off the system until it is recycled by input voltage;
automatically restart the system after a specific delay of time;
toggle the switch 35 off and on until the output capacitor 36 is discharged (in this case the comparator 32 will prevent the discharging the battery into a small impedance in abnormal situations at the output persists).

Figure 14:
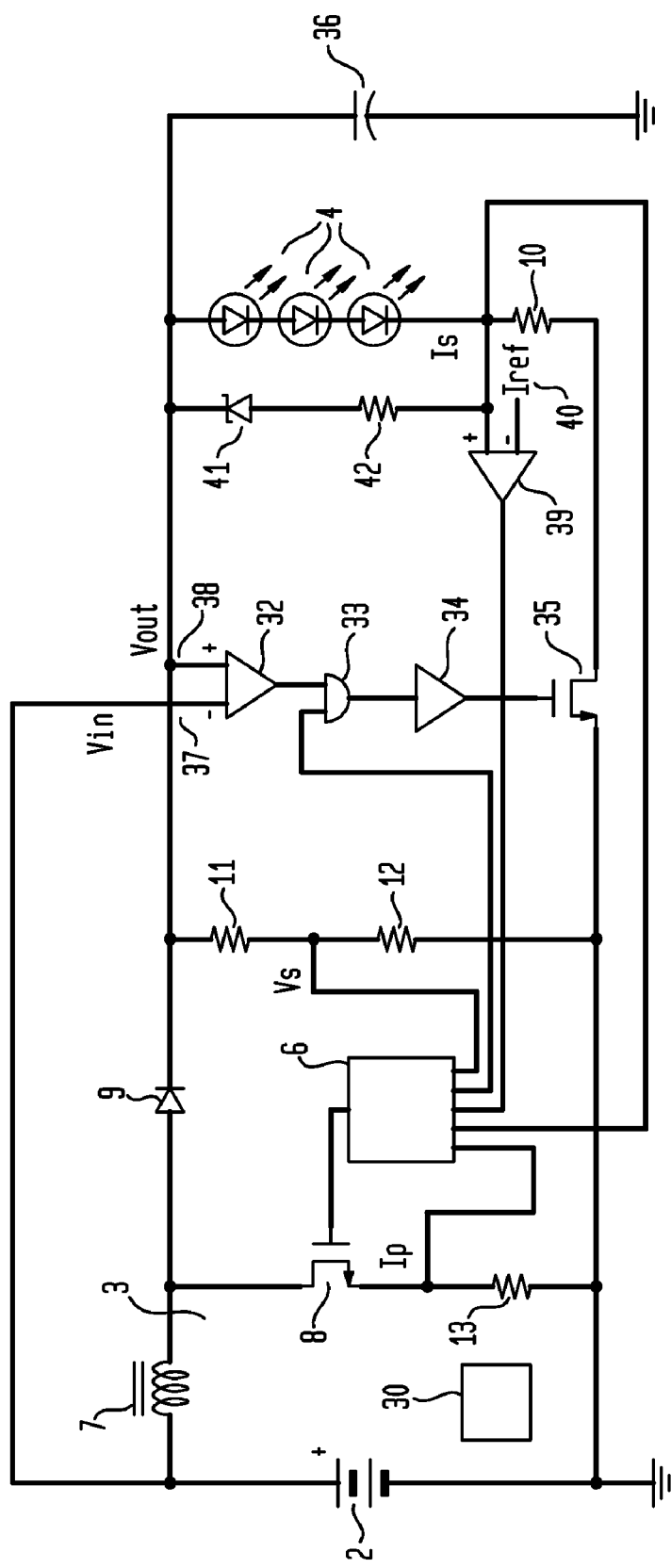
FIG. 14 is a block diagram of a power converter with protection against a short circuit and overvoltage.

Open circuit is one of the common failures of an LED. At this failure an overvoltage is developing very quickly, potentially dangerous to all components of the system. FIG. 14 illustrates another embodiment of the invention related to overvoltage protection. If output voltage goes higher than breakdown voltage of the zener diode 41, the excessive voltage appears on the sense terminal of the comparator 39, changing its state to high and triggering protection functions described above.

If regulator 6 gets a signal from the application system to shut down the system 1, it is an advantage of a such system to isolate the battery from driving circuits to save its power. It is a function of another embodiment of the invention implemented by a signal of regulator 6 at the AND gate 33. When the signal from regulator 6 goes low, the switch 35 is open and the battery is disconnected from driving circuits and load.

Figure 15:
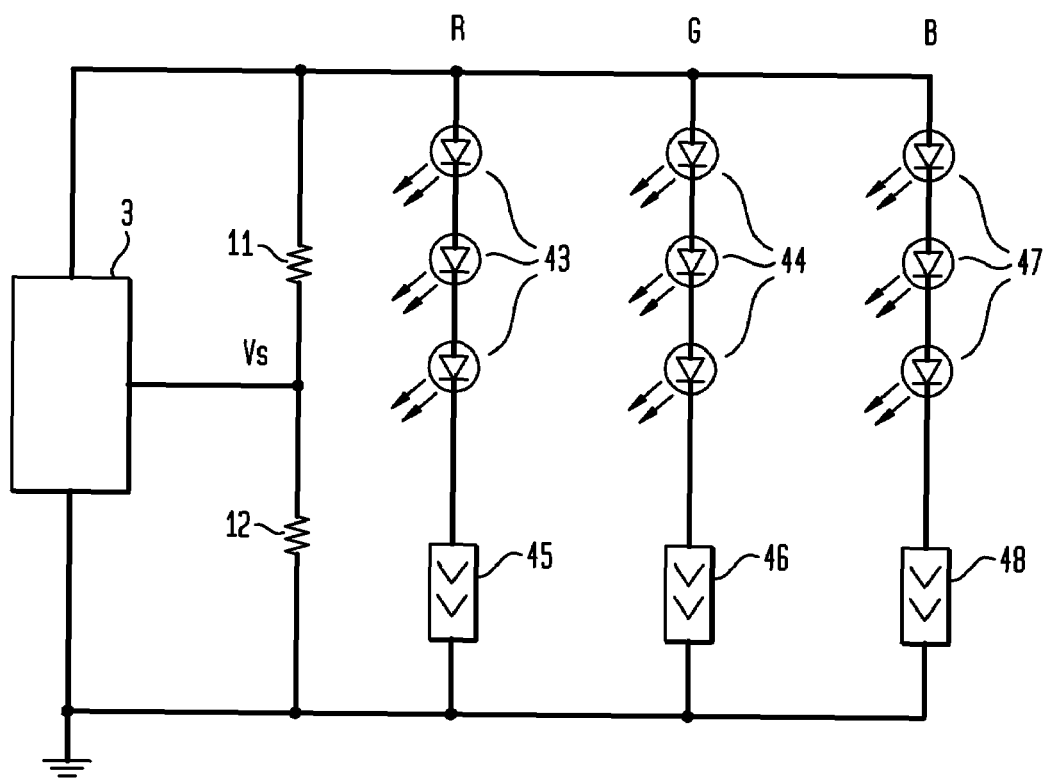
FIG. 15 is a block diagram of a power converter driving strings of R-G-B LEDS with current regulators.

On FIG. 15 presented a block diagram of R-G-B LEDs connected in three strings 43, 44, 47 with each string having an independent current regulator 45, 46, 48. Such connections of LEDs is a typical practice in modern color mixing systems. In this case it is desirable the power converter 3 to drive one or multiple strings of LEDs with the regulated voltage source with a feedback signal Vs from voltage sensor 11, 12. We described above method and system for driving a single or plurality of LEDs, regulating average current through LEDs. All referenced embodiments of the invention were illustrated by using current as a variable system parameter to regulate. By a principle of duality of electrical circuits controlling current through components, connected in series and voltage across components connected in parallel we can use similar systems and methods to drive one or multiple strings of LEDs by controlling voltage across strings of LEDs with some specifics of voltage regulation. For example, in case of voltage regulation the integrator 14 (FIG. 5) will measure LEDs 43, 44, 47 voltseconds (FIG. 15) by integrating output voltage for length of the cycle T and comparator 16 will have voltage set signal at negative terminal, all other arrangements of the system will remain the same as described above. Thus, in another embodiment of the invention the proposed system will work as a voltage boost or buck-boost converter if input of the regulator 6 is switched to the voltage feedback Vs. Vs is connected to a resistive divider 11,12. Signal Vs may also represent an output of light sensing device, then the driver will control light brightness rather than LED average voltage.

Although the present invention has been described above with respect to several embodiments, various modifications can be made within the scope of present invention. The various circuits described in FIGS. 5, 8, 9, 9B, 10, 11, 13, 14 are merely exemplary, and one skilled in the art will recognize that the circuitry and modules may be implemented in various manners using various technologies, digital or analog. Accordingly, the disclosure of the present invention is intended to be illustrative, but not limiting of the scope of invention, which is set forth in the following claims.

It is claimed:

1. A system for driving one or plurality of LEDs, comprising:
an energy source;
a power converter for transferring electrical power from said energy source to LEDs in a form of a controlled output current and providing said LEDs brightness regulation, said power converter being constructed as a switching converter, including an inductor, a rectifier, a power switch, operating in a dual phase cycle, having an on phase, when said power switch is closed, exciting said inductor by an input voltage, and an off phase when said power switch is open;

a peak current sensor through said power switch;
a regulator, controlling said dual phase cycle at a variable frequency and a constant off time, coupled to said power converter and receiving feedback signals from at least one of an electrical, thermal or optical sensor for sensing said LEDs performance and comprising:
 (i) an LEDs current sensor;
 (ii) an integrator with a reset, coupled to said LEDs current sensor for generating an integrated signal over said off phase of said cycle based on said LEDs current signal;
 (iii) a divider, coupled to said integrator to divide said integrated signal by a last cycle time;
 (iv) a comparator for comparing said integrated and divided LED's current signal to a reference signal;
 (v) a digital logic, sampling said comparator, resetting said integrator each cycle, measuring said last cycle time and generating a control signal to regulate said LEDs current;
 (vi) a D/A converter coupled to said digital logic to convert said control signal from digital to analog form; and
 (vii) a current peak comparator, connected to said peak current sensor to compare a peak current to a set point equal to said control signal and turning off said power switch, when said peak current in said power switch reaches a level of a set point;
an oscillator, coupled to said digital logic; and
a buffer to drive said power switch.

2. The system according to claim 1, wherein:
said digital logic increments said control signal once per cycle from one cycle to another by an amount inversely proportional to a difference between said reference signal and an electrical signal from said optical sensor.

3. The system according to claim 1, wherein:
said thermal sensor connected to a reference signal circuit to adjust said reference signal to compensate said LED's brightness changes due to temperature effects.

4. The system according to claim 1, wherein:
said energy source is an AC source with a second rectifier.

5. The system according to claim 1, wherein:
said energy source is a DC source or a battery.

6. The system according to claim 1, wherein:
said switching converter is a boost circuit or a buck-boost circuit.

7. The system according to claim 1, further comprising:
an input low voltage protection sub-circuit for turning off said power switch if said input voltage falls below a fixed threshold.

8. The system according to claim 1, further comprising:
a temperature protection sub-circuit for turning off said power switch if a temperature of said regulator exceeds a first fixed threshold and enabling said power switch back to operation when said temperature of said regulator falls below a second fixed threshold, wherein said second fixed threshold is smaller than said first threshold.

9. The system according to claim 1 further comprising:
an isolation power switch, connected between said LEDs and ground to disconnect said LEDs from the said energy source at abnormal modes or system shut down;
an abnormal mode comparator connected between an output and said input voltage and turning off said isolation power switch when said output voltage drops below said input voltage;
a logic to process signals to shut down said isolation power switch either from said abnormal mode comparator or from system shut down; and
a second buffer to drive said isolation power switch.

10. The system according to claim 1 further comprising:
an ambient optical photosensor to adjust said reference signal proportionally to ambient light conditions to regulate a brightness of said LEDs to keep a contrast of an area illuminated by said LED's constant.

11. The system according to claim 1, wherein:
said digital logic increments said control signal once per cycle from one cycle to another by an amount inversely proportional to a difference between said reference signal and said integrated LEDs current signal.

12. The system according to claim 1, wherein
said control signal incremented by said digital logic by amounts defined in a look up table, including a fixed minimum level and a fixed maximum level.

13. The system according to claim 1 further comprising:
an overload comparator connected between said LEDs current sensor and an overload set signal to send a signal to said digital logic about fault conditions at said LEDs, wherein said digital logic shuts down said power switch until power reset or turns said power switch on and off to limit an overload current in said LEDs.

14. The system according to claim 13 further comprising:
a zener diode and a resistor connected between an output voltage or an anode of said rectifier and a positive terminal of said overload comparator to provide an output overvoltage protection.

15. An integrated controller to regulate a boost or a buck boost power converter for transferring electrical power from an energy source to LEDs in a form of controlled output current and providing said LEDs brightness regulation, said power converter being constructed as a switching discontinuous current mode converter, including an inductor, a rectifier, an output capacitor, an oscillator, a power switch, operating in a dual phase cycle, having an on phase, when said power switch is closed, exciting said inductor by an input voltage, and an off phase when said power switch is open, fully discharging said inductor, wherein said integrated controller regulating said dual phase cycle at a variable frequency and a constant off time by generating said on phase on time and receiving feedback signals from at least one of an electrical, thermal or optical sensors for sensing said LEDs performance and comprising:
 (i) an LEDs current sensor;
 (ii) an integrator with a reset, coupled to said LEDs current sensor for generating an integrated signal over said off phase of said cycle of said LED's current signal;
 (iii) a divider, coupled to said integrator to divide said integrated signal by a last cycle time;
 (iv) a comparator for comparing said integrated and divided LEDs current signal to a set reference signal; and
 (v) a digital logic, sampling said comparator, resetting said integrator each cycle, measuring said last cycle time and incrementing said on time each cycle from cycle to cycle to turn on and off said primary switch to regulate said LED brightness.

16. The integrated controller according to claim 15 wherein:
said on time generated each cycle by said digital logic for:
 a) said LED's current smaller than said current signal, as a sum of a last cycle on time and a product of a small time increment by a consecutive number of cycle in progress since said LED's current dropped below set reference signal, wherein said on time is limited to a fixed maximum value; and b) said LED's current larger than said set reference signal, as a subtraction of a product of a small time increment by a number minus one of consecutive off time blocks, counted as long as said LEDs current remains larger than said set reference signal, from said last cycle on time, wherein said generated on time is limited to a minimum fixed time value.

17. The integrated controller according to claim 15 further comprising:
   a peak current sensor through said power switch; and
   a current peak comparator to compare a peak current through said power switch to said set reference signal to limit said peak current through said power switch or to limit a maximum on time, based on value of said input voltage.

18. An integrated controller to regulate a boost or a buck boost power converter for transferring electrical power from an energy source to LEDs in a form of controlled output current and providing said LEDs brightness regulation, a power converter being constructed as a switching discontinuous current mode converter, comprising an inductor, a rectifier, an output capacitor, an oscillator, a power switch, operating in a dual phase cycle, having an on phase, when said power switch is closed, exciting said inductor by an input voltage, and an off phase when said power switch is open, fully discharging said inductor, wherein said controller regulating said dual phase cycle at a variable frequency and a constant off time by generating said on phase on time and receiving feedback signals from at least one of an electrical, thermal or optical sensors for sensing said LEDs performance and comprising:
   (i) an LEDs current sensor;
   (ii) an R-C filter of said LEDs current;
   (iii) a comparator for comparing said filtered LED's current signal to a set reference signal; and
   (iv) a digital logic, sampling said comparator, incrementing said on time each cycle from cycle to cycle to turn on and off said power switch to regulate said LEDs brightness.

19. The integrated controller according to claim 18 wherein:
   said on time generated each cycle by said digital logic for:
   a) said LED's current smaller than said current signal, as a sum of a last cycle on time and a product of a small time increment by a consecutive number of cycle in progress since said LED's current dropped below set reference signal, wherein said on time is limited to a fixed maximum value; and
   b) said LED's current larger than said set reference signal, as a subtraction of a product of a small time increment by a number minus one of consecutive off time blocks, counted as long as said LEDs current remains larger than said set reference signal, from said last cycle on time, wherein said generated on time is limited to a minimum fixed time value.

20. The integrated controller according to claim 18 further comprising:
   a peak current sensor through said power switch; and
   a current peak comparator to compare a peak current through said power switch to said set reference signal to limit said peak current through said power switch or to limit a maximum on time, based on value of said input voltage.

21. A system for driving one or plurality of LEDs by transferring electrical power from an energy source to LEDs in a form of a controlled output voltage and providing said one or multiple strings of LEDs voltage regulation, said power converter being constructed as a switching converter, including an inductor, a rectifier, a power switch, operating in a dual phase cycle, having an on phase, when said power switch is closed, exciting said inductor by an input voltage, and an off phase when said power switch is open;
   a peak current sensor through said power switch;
   a regulator, controlling said dual phase cycle at a variable frequency and a constant off time, coupled to the said power converter and receiving feedback signal from said LEDs, comprising:
   (i) a LEDs voltage sensor;
   (ii) an integrator with a reset, coupled to said LED's voltage sensor for generating an integrated said LED's voltage signal over a cycle time;
   (iii) a divider, coupled to said integrator to divide an integrated signal by a last cycle time;
   (iv) a comparator for comparing said integrated and divided LEDs voltage signal to a reference signal;
   (v) a digital logic, sampling said comparator, resetting said integrator each cycle, measuring said last cycle time and generating a control signal to regulate said LED's voltage;
   (vi) a D/A converter coupled to said digital logic to convert said control signal from digital to analog form;
   (vii) a current peak comparator, connected to said peak current sensor to compare a peak current to a set point equal to said control signal and turning off said power switch when said peak current in said power switch reaches a level of said set point; and
   an oscillator, coupled to set digital logic.

22. An integrated controller to regulate a boost or buck boost power converter for transferring electrical power from an energy source to LEDs in a form of a controlled output voltage and providing said LEDs brightness regulation, said power converter being constructed as a switching discontinuous current mode converter, including an inductor, a rectifier, an output capacitor, an oscillator, a power switch, operating in a dual phase cycle, having an on phase, when said power switch is closed, exciting said inductor by an input voltage, and an off phase when said power switch is open, fully discharging said inductor, wherein said controller regulating said dual phase cycle at a variable frequency and a constant off time by generating said on phase on time and receiving feedback signal from said LEDs and comprising:
   (i) an LEDs voltage sensor;
   (ii) an integrator with a reset, coupled to said LEDs voltage sensor for generating an integrated signal over a cycle time, based on said LED's voltage signal;
   (iii) a divider, coupled to said integrator to divide integrated signal by a last cycle time;
   (iv) a comparator for comparing said integrated and divided LED's voltage signal to a set reference signal;
   (v) a digital logic, sampling said comparator, resetting said integrator each cycle, measuring said last cycle time and incrementing said on time each cycle from cycle to cycle to turn on and off said primary switch to regulate the said LED's voltage.

* * * * *